United States Patent [19]

Myers

[11] Patent Number: 4,881,211
[45] Date of Patent: Nov. 14, 1989

[54] MULTIPLE FREQUENCY RANGE HYDRAULIC ACTUATOR

[75] Inventor: Wilbur J. Myers, Ft. Worth, Tex.

[73] Assignee: Conoco Inc., Ponca City, Okla.

[21] Appl. No.: 265,601

[22] Filed: Oct. 31, 1988

[51] Int. Cl.⁴ .......................................... H04R 23/00
[52] U.S. Cl. .................................. 367/143; 367/174; 91/530; 91/167 R; 92/65
[58] Field of Search ............... 367/143, 174; 181/110, 181/120, 402; 91/530, 167 R; 92/65

[56] References Cited

U.S. PATENT DOCUMENTS

| | | | |
|---|---|---|---|
| 3,653,298 | 4/1972 | Bilodeau | 92/65 |
| 4,139,733 | 2/1979 | Falkenberg | 381/202 |
| 4,741,246 | 5/1988 | Padarev | 91/530 |

Primary Examiner—Charles T. Jordan
Assistant Examiner—John Woodrow Eldred

[57] ABSTRACT

A multiple frequency range hydraulic actuator includes a low frequency cylinder with a low frequency actuator piston within. The low frequency piston operates as a high frequency cylinder having a high frequency piston within. The low frequency piston, and high frequency piston operate in conjunction to generate low frequency movement. The high frequency piston operates independently to generate high frequency movement.

3 Claims, 2 Drawing Sheets

MULTIPLE FREQUENCY RANGE HYDRAULIC ACTUATOR

CROSS REFERENCE TO RELATED APPLICATION

This application is related to the concurrently filed U.S. Pat. application Ser. No. 265,428 entitled "Compound Hydraulic Seismic Source Vibrator".

BACKGROUND OF THE INVENTION AND RELATED ART

The present invention relates to hydraulic actuators which may be used in seismic pulse generation and more particularly to hydraulic actuators which are capable of generating acoustic pulses having several different frequency ranges.

In present seismic exploration, acoustic pulses are generated by seismic sources, propagate through the earths crust, are reflected by subsurface interfaces and detected upon the return to the surface. In marine exploration, seismic sources have taken the form of explosive charges and airguns. However, both of these types of seismic sources have had deleterious effects on marine life. As a result, a hydraulic vibrator had been developed. The hydraulic vibrator used in marine exploration is similar to that used in land based seismic exploration This type of seismic source has been found to have less deleterious effects on marine ecosystems.

In seismic pulse generation, it is beneficial to be able to generate pulses over a wide frequency range. In this regard, the use of hydraulic vibrators includes a problem in the range of frequencies generated. In general, a hydraulic vibrator system includes a hydraulic power plant, a hydraulic cylinder, hydraulic circuitry and structural members designed to operate over a range of frequencies. Stroke and flow requirements for low frequency operation necessarily are exclusive of high frequency operation due to their size and mass. Similarly, stroke and flow design requirements concomitant with high frequency propagation exclude the applicability of these vibrator systems from use in low frequency systems.

PRIOR ART

An example of an early type hydraulic vibrator system is described in U.S. Pat. No. 3,392,369 titled "Fluid-Actuated Dual Piston Underwater Sound Generator" issued to J. A. Dickie et al. In the patent, two similarly sized sound radiating pistons are driven by hydraulic actuators in unison. The pistons are arranged as a pair of oppositely outwardly facing elements on opposite sides of the stationary housing and are sealed to the housing by flexible rubber gaskets. The actuator is adapted to move each piston in the direction opposite to that of the other at any particular time. As the pistons move out changing the external volume of the transducer, the internal space is filled with a gas under pressure. The apparatus described in this patent is designed to operate at low frequencies so that the sound waves which are generated under water have low attenuation.

U.S. Pat. Nos. 3,329,930 and 3,394,775, both entitled "Marine Vibration Transducer" issued to J. R. Cole et al. also describe hydraulic seismic source generators. The 3,329,930 patent relates to a vibrational transducer that is driven at a controlled rate, two-part vibration by driving a piston vertically, reciprocally against the water medium. In this patent, a single piston is used in conjunction with a single actuator. The 3,394,775 patent, which is a continuation in part of the 3,329,930 patent, introduces a vibrational transducer unit which consists of two pistons attached to a cylinder and a piston rod. A flexible rubber cylinder or boot is slipped over these two pistons and securely fastened to each so that air which is trapped between the pistons cannot escape into the water nor can water flow into the air chamber. The reciprocating piston imparts a pressure wave into the water while the innerhousing areas within the rubber enclosure are isolated and maintained at a predetermined air pressure such that maximum coupling of vibrational energy into the water medium is provided.

U.S. Pat. No. 3,482,646 titled "Marine Vibrator Devices" issued to G. L. Brown et al. is a single piston, single actuator type of assembly similar to that of the 3,392,369 patent. A pair of shell-like housing members are disposed generally in parallel and are flexibly sealed between the respective outer peripheries to define an interior air space. A drive means is contained within the air space and connected to the respective housing members to impart reciprocal movement to one housing member with respect to the other.

Additional hydraulic seismic source generating systems are described in U.S. Pat. No. 4,103,280, titled "Device for Emitting Acoustic Waves in a Liquid Medium" issued to Jacques Cholet et al., U.S. Pat. No. 4,211,301 titled "Marine Seismic Transducer" issued to J. F. Mifsud, U.S. Pat. No. 4,294,328 titled "Device for Emitting Acoustic Waves in a Liquid Medium by Implosion" issued to Jacques Cholet et al. and U.S. Pat. No. 4,578,784 titled "Tunable Marine Seismic Source" issued to J. F. Mifsud.

However, as stated previously, all of the foregoing hydraulic vibrator systems share a common problem. That is, none of the foregoing systems are capable of operating over a wide range of frequencies but in general, are limited to acoustic pulse generation in the low frequency range.

SUMMARY OF THE INVENTION

The present invention provides a dual mode hydraulic actuator capable of activating a radiating surface at a multiple inconsistent frequency ranges. A large low frequency piston having a large mass and a long strobe distance is located within a large outer cylinder to generate low frequency movement. A high frequency piston is located within the low frequency piston which acts as the high frequency cylinder. The high frequency piston has a small mass and a short stroke which generates high frequency movement. Thus the present invention is capable of generating two inconsistent frequency ranges, a low frequency range which requires large mass and long stroke distance, and a high frequency range which requires small mass and short stroke distance.

DESCRIPTION OF THE PREFERRED EMBODIMENT

The following description identifies an apparatus by which both low frequency and high frequency acoustic pulses may be generated in subsurface environments. A compound marine vibrator is described in which a woofer/tweeter type of arrangement is configured to permit generation of both low frequency and high frequency acoustic pulses.

Figure 1:
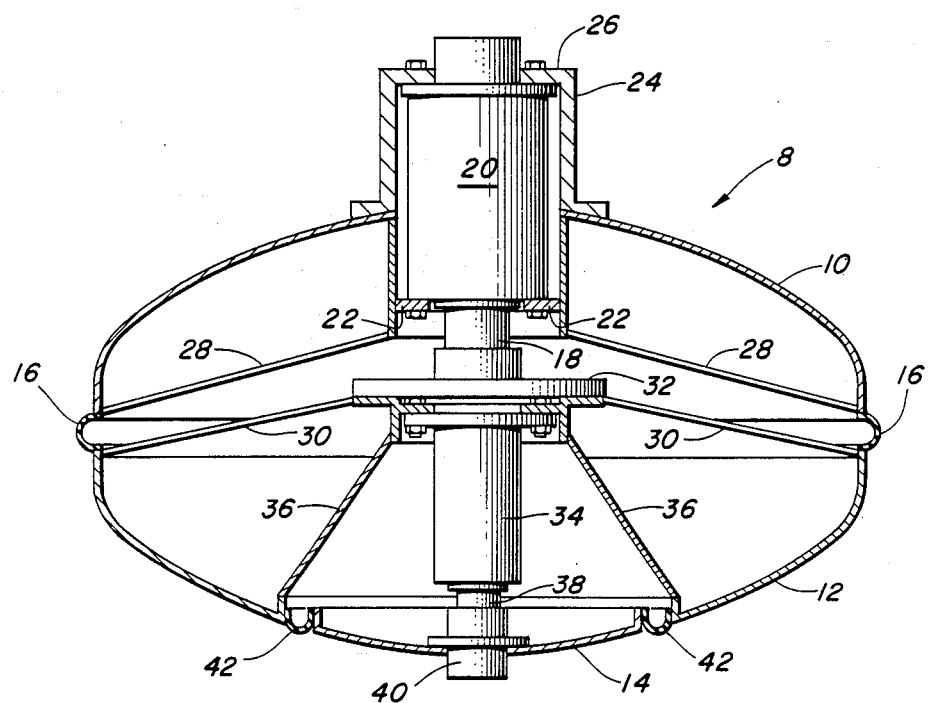
FIG. 1 is a partial sectional side view of a first embodiment of a compound hydraulic seismic source vibrator.

Referring now to FIG. 1, a first embodiment of the present invention is illustrated as hydraulic vibrator 8 which includes an upper housing 10, a low frequency radiating surface 12, and a high frequency radiating surface 14. Low frequency radiating surface 12 is connected to upper housing portion 10 through flexible gasket 16 and low frequency piston rod 18. Low frequency piston rod 18 is connected to low frequency piston (not shown) within low frequency hydraulic cylinder 20. Low frequency hydraulic cylinder 20 is mounted to upper housing 10 on a cross piece 22 and on a cap 24 at its top ledge 26. Cap 24 is mounted on upper housing 10 at its central uppermost portion. Support brackets 28 are provided connecting upper housing 10 with cross pieces 22 to provide stability for low frequency hydraulic cylinder 20. Additional support brackets 30 are connected to a support disk 32 which is mounted on low frequency piston rod 18. Support brackets 30 are connected to low frequency radiating surface 12 to transmit the force generated through low frequency piston rod 18 directly to low frequency radiating surface 12.

High frequency hydraulic cylinder 34 is mounted on support disk 32 which has additional support members 36 mounted to low frequency radiating surface 12. High frequency piston rod 38 is connected directly to high frequency radiating surface 14 through mounting disk 40. High frequency radiating surface 14 is connected to low frequency radiating surface 12 through flexible gasket 42.

In operation, when low frequency acoustic pulses are to be generated, hydraulic cylinder 20 is actuated which drives low frequency piston rod 18. Movement of low frequency piston rod 18 forces low frequency radiating surface 12 along with support disk 32, high frequency hydraulic cylinder 34, mounting disk 40, and high frequency radiating surface 14 to move in unison to generate low frequency acoustic pulses. During high frequency operation, low frequency piston rod 18 is maintained in a stable position, holding support disk 32 fixed. Accordingly, high frequency hydraulic cylinder 34 is also held fixed allowing high frequency piston rod 38 to move independent of support disk 32 and low frequency radiating surface 12. In operation, high frequency piston rod 38 moves, moving mounting disk 40 which is connected to high frequency radiating surface 14 causing the generation of high frequency acoustic pulses. Low frequency radiating surface 12, due to its connection to support disk 32, high frequency hydraulic cylinder 34, and high frequency radiating surface 14, is only capable of generating low frequency acoustic pulses due to the mass involved. On the other hand, high frequency radiating surface can be moved rapidly to generate high frequency acoustic pulses by the action of high frequency piston rod 38 due to its size and its construction for movement independent of the operation of low frequency radiating surface 12.

In this regard, hydraulic vibrator 8 provides an acoustic pulse generator capable of generating both low frequency acoustic pulses and, because of its unique configuration, high frequency acoustic pulses also.

Figure 2:
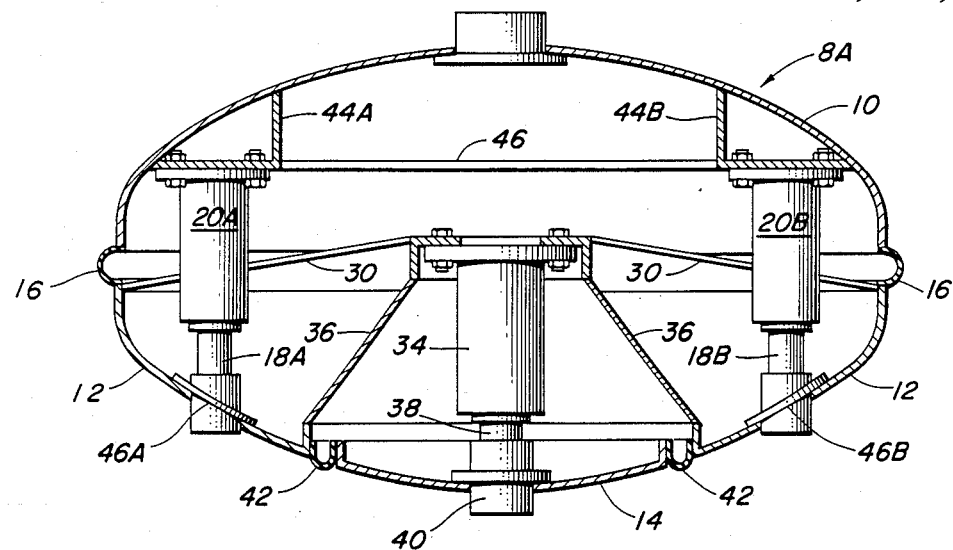
FIG. 2 is an alternative embodiment of a compound hydraulic seismic source vibrator which utilizes two low frequency hydraulic cylinders and one high frequency hydraulic cylinder.

Referring now to FIG. 2, a second embodiment of the present invention is illustrated having similar components identified with the same numerals as those in FIG. 1. In the embodiment of FIG. 2, two low frequency hydraulic cylinders 20A and 20B are illustrated as individually being connected to low frequency radiating surface 12.

Cylinders 20A and 20B are mounted to upper housing 10 through brackets 44A and 44B, respectively. Brackets 44A and 44B are further supported by cross piece 46. In operation, low frequency hydraulic cylinders 20A and 20B are actuated simultaneously causing low frequency piston rods 18A and 18B to move low frequency radiating surface 12 in unison. Low frequency piston rods 18A and 18B are connected directly to low frequency radiating surface 12 through mounting disks 46A and 46B. When low frequency hydraulic cylinders 20A and 20B are not actuated, they maintain the position of low frequency radiating surface 12 in a fixed position with respect to upper housing 10. Accordingly, high frequency radiating surface 14 may be moved by high frequency piston rod 38 through the actuation of high frequency hydraulic cylinder 34 independently of low frequency radiating surface 12. This is due to the fact that high frequency hydraulic cylinder 34 is mounted on support members 36 and support brackets 30, both of which are secured to low frequency radiating surface 12.

As with the operation of the embodiment illustrated in FIG. 1, hydraulic vibrator 8A as illustrated in FIG. 2 may generate low frequency acoustic pulses through the operation of low frequency hydraulic cylinders 20A and 20B in unison, forcing the motion of low frequency radiating surface 12, support brackets 30, support members 36, high frequency hydraulic cylinder 34, high frequency radiating surface 14 and mounting disk 40. When high frequency acoustic pulses are desired, actuation of high frequency hydraulic cylinder 34 permits motion of high frequency radiating surface 14 independent of low frequency radiating surface 12.

In operation, for both the embodiments of FIG. 1 and FIG. 2, any movement of the low frequency hydraulic cylinder piston rod 18 in FIG. 1 or 18A and 18B in FIG. 2 is transmitted directly to the low frequency radiating surface 12, the high frequency hydraulic cylinder 34 and the high frequency radiating surface 14 only. Any movement of the high frequency hydraulic cylinder piston rod 38 is transmitted directly to the high frequency radiating surface 14. Thus, the low frequency hydraulic system is optimized to drive the low frequency hydraulic cylinder over a range of frequencies from very low frequency, long stroke, up to intermediate frequencies. The high frequency hydraulic system is optimized to drive the high frequency hydraulic cylinder over a range of frequencies from intermediate frequencies up to very high frequencies. The stroke of the high frequency hydraulic cylinder is relatively short, to minimize the volume of hydraulic oil between a hydraulic servovalve and the face of the hydraulic cylinder ram. Also, the structural mass is very small so that the system can be driven at very high frequencies. The outer housing of low frequency hydraulic cylinder 20 and that of hydraulic cylinder 20A and 20B in FIG. 2 is attached to the upper housing 10 of vibrators 8 and 8A, respectively, in order to minimize the mass that the low frequency cylinder is required to move. Also, the outer housing of high frequency hydraulic cylinder 34 rather than high frequency piston rod 38 is attached to low frequency radiating surface 12 in order to minimize the mass that the high frequency cylinder is required to move.

The upper housing of the compound vibrator is relatively heavy as compared with the radiating surfaces in order to maximize the amount of energy that is radiated in a downward direction. Vibrators 8 and 8A are also larger in diameter than conventional marine vibrators so that a large amount of energy can be output at low frequencies. This, combined with superior high frequency performance, results in a fewer number of vibrators being required for a given total energy output, as compared with conventional marine vibrators. The number of power plants, amount of handling equipment, and number of persons required to operate the equipment can also be less. Compound marine vibrators 8 and 8A may be operated in numerous modes. For example, marine vibrators 8 and 8A may be operated by actuating only the low frequency hydraulic cylinder 20 or 20A and 20B. The vibrator thus functions as a conventional marine vibrator. High frequency radiating surface 14 would not move with respect to low frequency surface 12. Thus, the frequency bandwidth would be limited to low to mid-range frequencies.

A second mode in which marine vibrators 8 or 8A may be operated is one in which the vibrator could start a sweep at very low frequencies with the high frequency hydraulic cylinder 34 fixed or with the same sweep as the low frequency hydraulic cylinder 20. As intermediate frequencies are reached, the low frequency sweep system could be stopped and the high frequency system would continue to the desired level.

A third mode in which the marine vibrator system may be operated is one in which the low frequency and high frequency systems could be actuated simultaneously with two different sweeps. For example, the low frequency system could sweep through a frequency range of 3 to 50 Hz at the same time that the high frequency system was sweeping with a frequency range of 50 to 150 Hz.

Finally, a fourth mode in which marine vibrators 8 or 8A could be operated is one in which the vibrator functions as a conventional marine vibrator by actuating only the high frequency system.

Hydraulic and electrical control circuitry required to produce and control the vibrator sweeps are not illustrated since the actual controls are conventional and are considered to be standard for the industry and understood by one skilled in the art.

Figure 3:
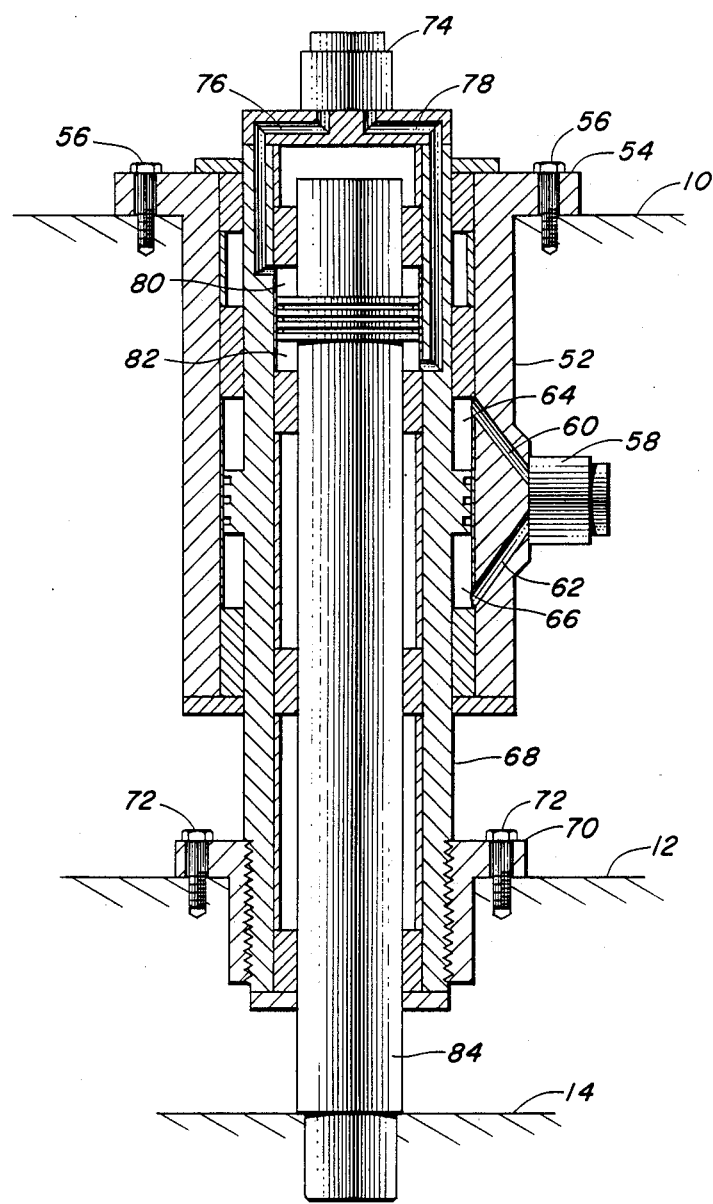
FIG. 3 is a variation of the compound hydraulic seismic source vibrator of FIG. 1 in which the low frequency and the high frequency hydraulic cylinders are combined into a single cylinder.

Referring now to FIG. 3, a compound hydraulic actuator is illustrated. This actuator may be used in the embodiment of FIG. 1. Reference surfaces and similar portions of the actuator have been identified with the same numbers as they appear in FIG. 1. The top portion of a main cylinder housing 52 is attached to the upper housing 10 of a hydraulic vibrator or the like. Main cylinder housing 52 has a lip 54 which may be attached to upper housing 10 through the use of bolts 56 or by some other method known in the art such as welding, etc. Illustrated as a portion of main cylinder housing 52 is hydraulic servo control 58 with inlet/outlet passages 60 and 62. Passages 60 and 62 feed to open areas 64 and 66, respectively, between main cylinder housing 52 and a low frequency piston actuator 68. Low frequency actuator piston 68 may be connected to low frequency radiating surface 12 or to any similar device which is to be actuated at low frequencies. Piston 68 is fixed to surface 12 by bracket 70 through bolts 72. The top portion of low frequency actuator piston 68 includes high frequency servo control 74 which includes inlet outlet passages 76 and 78 that feed open areas 80 and 82 located between low frequency actuator piston 68 and high frequency actuator piston 84. High frequency piston 84 may be connected to a high frequency radiating surface 14 or the like by any method known in the art.

In operation, low frequency actuator piston 68 and high frequency actuator piston 84 may be connected to any surface which requires vibrating or back forth motion of the frequencies these two pistons are designed to generate. For low frequency operation, servo control 58 forces hydraulic fluid through passage 60 into open area 64 to force low frequency actuator piston 68 towards its full downward position. When this has been accomplished, servo control 58 reverses, permitting fluid to exit open area 64 through passage 60 while forcing fluid into open area 66 through passage 62. Since the combined length of open areas 64 and 66 comprise a long stroke distance, piston 68 will move surfaces 12 and 14 at a low frequency rate.

When actuation of surface 14 at a high frequency is desired, servo control 74 is used to force fluid through passage 76 into open area 80 forcing high frequency actuator piston 84 to its fully outwardly extended position. Upon reaching its fully extended position, hydraulic fluid is then forced into open area 82 through passage 78 while hydraulic fluid occupying open area 80 is permitted to exit through passage 76. Thus, an in and out motion is provided through high frequency actuator piston 84 to vibrate surface 14 at a high frequency. The high frequency is accomplished through two aspects. First, high frequency actuator piston 84 together with surface 14 constitute a low mass. Second, the stroke length of high frequency actuator piston 84 is short, that is, the total length of open areas 80 and 82, when high frequency actuator piston 84 is centered as illustrated in FIG. 3 is relatively short when compared to the stroke length of low frequency piston 68.

Thus, a single cylinder assembly may be used to generate both low frequencies such as 5 to 50 Hz and high frequencies such as 50 to 150 Hz through the use of the design of the present invention.

Although the present invention was illustrated by way of a preferred embodiment, it is understood that the present invention should not be limited to the described embodiments but only limited by the following claim elements and their equivalents.

I claim:

1. A compound hydraulic actuator for operating in two frequency ranges comprising:
    a main cylinder housing means;
    a low frequency piston means for providing low frequency, long stroke reciprocation within said main cylinder housing, said piston means having an internal opening configured to define a second cylinder; and
    a high frequency piston means positioned within said second cylinder for providing high frequency, shorter stroke reciprocation.

2. The compound hydraulic actuator according to claim 1 wherein said main cylinder housing means also includes a low frequency hydraulic servo control for driving said low frequency piston means.

3. The compound hydraulic actuator according to claim 2 wherein said low frequency piston means also includes a high frequency hydraulic servo control for driving said high frequency piston means.

* * * * *